W. J. THOMPSON.
PLATE HOLDER FOR CAMERAS.
APPLICATION FILED MAY 20, 1912.
1,049,944.
Patented Jan. 7, 1913.
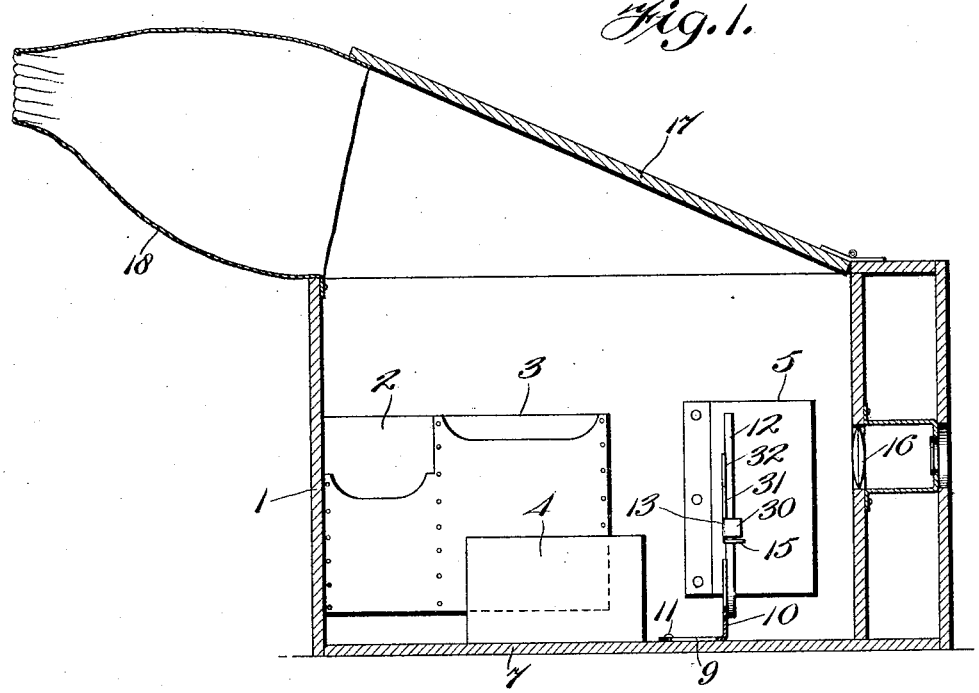
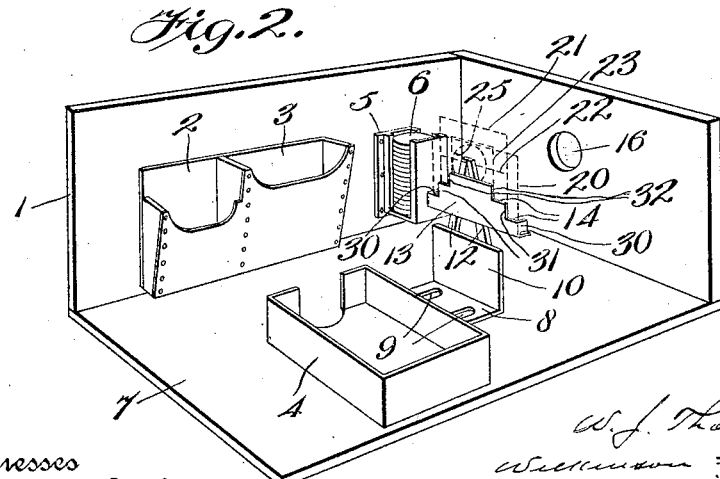

UNITED STATES PATENT OFFICE.

WILLIAM J. THOMPSON, OF NEW YORK, N. Y.

PLATE-HOLDER FOR CAMERAS.

1,049,944.  Specification of Letters Patent.  Patented Jan. 7, 1913.

Application filed May 20, 1912. Serial No. 698,535.

*To all whom it may concern:*

Be it known that I, WILLIAM J. THOMPSON, a citizen of the United States, residing at New York, in the county of New York and State of New York, have invented certain new and useful Improvements in Plate-Holders for Cameras; and I do hereby declare the following to be a full, clear, and exact description of the invention, such as will enable others skilled in the art to which it appertains to make and use the same.

This invention relates to plate holders for cameras, and has for its object to produce an efficient, simple, and inexpensive means for holding sensitized plates in proper position for exposure, all as will be more fully explained below.

To these ends the invention consists in the novel details of construction and combinations of parts more fully hereinafter described and particularly pointed out in the claims.

Referring to the accompanying drawings forming a part of this specification, in which like numerals designate like parts in all the views:—Figure 1 is a sectional view illustrating one form of camera with my invention applied thereto; and Fig. 2 is a perspective view with the top, end, and one of the side walls removed.

1 indicates any suitable camera body, the inside of which may be provided with a compartment 2 for holding small sensitive plates, a compartment 3 for holding large sensitive plates, a compartment 4 for post cards, and compartment 5 for buttons 6. Adjustably attached to the bottom 7 of the box, is a support consisting of a plate or bracket 8, having the slots 9 through which pass the screws 11 so that the said plate may be properly adjusted and then firmly secured in place. Said plate 8 is also provided with the right angle extension 10 to which is permanently secured the magnet 12. The said magnet has in turn permanently secured thereto the flanged plate 13, provided with the steps 14, and with the projecting supporting flange or step 15. The members 8, 10, 12 and 13 constitute my improved plate holder, and it is permanently fixed by the screws 11 at the proper distance from the lens or aperture 16.

17 represents a hinged lid for the camera proper, and 18 a sleeve through which the operator may insert his hand for manipulating the parts while excluding the light.

In operation the camera is first opened in order that the operator may be familiar with the location of the various parts, and the compartments are loaded with the plates it is desired to expose.

The sensitive plates being wrapped in light tight paper, the hand is inserted through the sleeve 18, the paper removed from the plate selected, and the gray or sensitive side of said plate is exposed toward the lens 16, while the other side is brought in contact with the magnet 12 and held there by magnetic attraction.

If a large tin type is exposed and a group is to be taken it will occupy the position indicated by the dotted rectangle 20, while if an individual is to be photographed, the operator will turn the plate through 90° so as to make it occupy the position indicated by the dotted rectangle 21. A small plate for a group will occupy the dotted rectangle 22, and the same plate when exposed for an individual will occupy the position of the rectangle 23. In each of the cases just mentioned, the plates will rest on the supporting flange 15. If a button 6, however, is to be exposed it may be placed by the operator in the position indicated by the dotted circle 25 and held there by the magnet.

While exposing a non-magnetic plate, such as a post card, it may be held by its edges [in the position indicated] by the fingers of the operator while he with the other hand manipulates the camera. In the case of magnetic plates, however, the magnet 12 may be relied upon to hold them in position.

In positioning the plates whether magnetic or not, the operator is greatly aided by the steps 14. That is to say, he may feel with his fingers to locate the small turned over lips 30 located immediately above the supporting flange 15, and may thereupon easily fit the postal card plates between said lips as indicated by the dotted rectangle 20. Likewise, when exposing said post card plates on end as indicated by the dotted rectangle 21, the operator feels with his fingers and locates the vertical edges 31 of the first step 14, and causes the vertical edges of the post card to register therewith. When exposing a plate for a group picture the end edges of the same are also made to register with said edges 31 as indicated by the rectangle 22, while when exposing said plate for an individual, its side edges are likewise made to register with the vertical edges 32 of the upper step 14, as indicated by the rectangle 23.

In all cases it will thus be seen that the operator may not only be assured that the plates are securely held in position while being exposed, but that they are correctly positioned by the flanges 30 or the edges 31 or 32.

In the case of the buttons 6, the top of the plate 13 and the top of the magnet 12 constitute a sufficient positioning guide.

It is obvious that those skilled in the art may vary the details of construction as well as the arrangement of parts without departing from the spirit of my invention, and therefore, I do not wish to be limited to the above construction, except as may be required by the claims.

What I claim is:—

1. In a camera the combination of a support; a magnet attached to said support; and a plate associated with said magnet provided with means for supporting the sensitive plates to be exposed, and with means to aid the operator in correctly positioning said sensitive plates, substantially as described.

2. In a camera the combination of an adjustable support comprising a slotted bracket; a magnet attached to said support; and a plate associated with said magnet provided with means for supporting the sensitive plates to be exposed, and with means to aid the operator in correctly positioning said sensitive plates, substantially as described.

3. In a camera the combination of a magnet with which sensitive plates are adapted to contact; a plate provided with means for aiding the operator in properly positioning said sensitive plates while contacting with said magnet; and means for fixedly securing said magnet in the camera, substantially as described.

4. In a camera the combination of a magnet with which sensitive plates are adapted to contact; a plate provided with means consisting of steps having vertically positioned edges for aiding the operator in properly positioning said sensitive plates while contacting with said magnet; and means comprising a slotted bracket for fixedly securing said magnet in the camera, substantially as described.

5. In a camera the combination of a slotted support having a plate extending at right angles thereto; a magnet fixed to said plate; and a flanged plate having guiding turned over lips and steps with vertical edges fixed to said magnet for aiding the operator in properly positioning the sensitive plates, substantially as described.

In testimony whereof, I affix my signature, in presence of two witnesses.

WILLIAM J. THOMPSON.

Witnesses:
C. SINGLEY,
R. J. FULLERTON.

---

Copies of this patent may be obtained for five cents each, by addressing the "Commissioner of Patents, Washington, D. C."